March 3, 1953     J. SINKO ET AL     2,630,539
CIGAR LIGHTER KNOB LIGHT
Filed July 26, 1951     2 SHEETS—SHEET 1
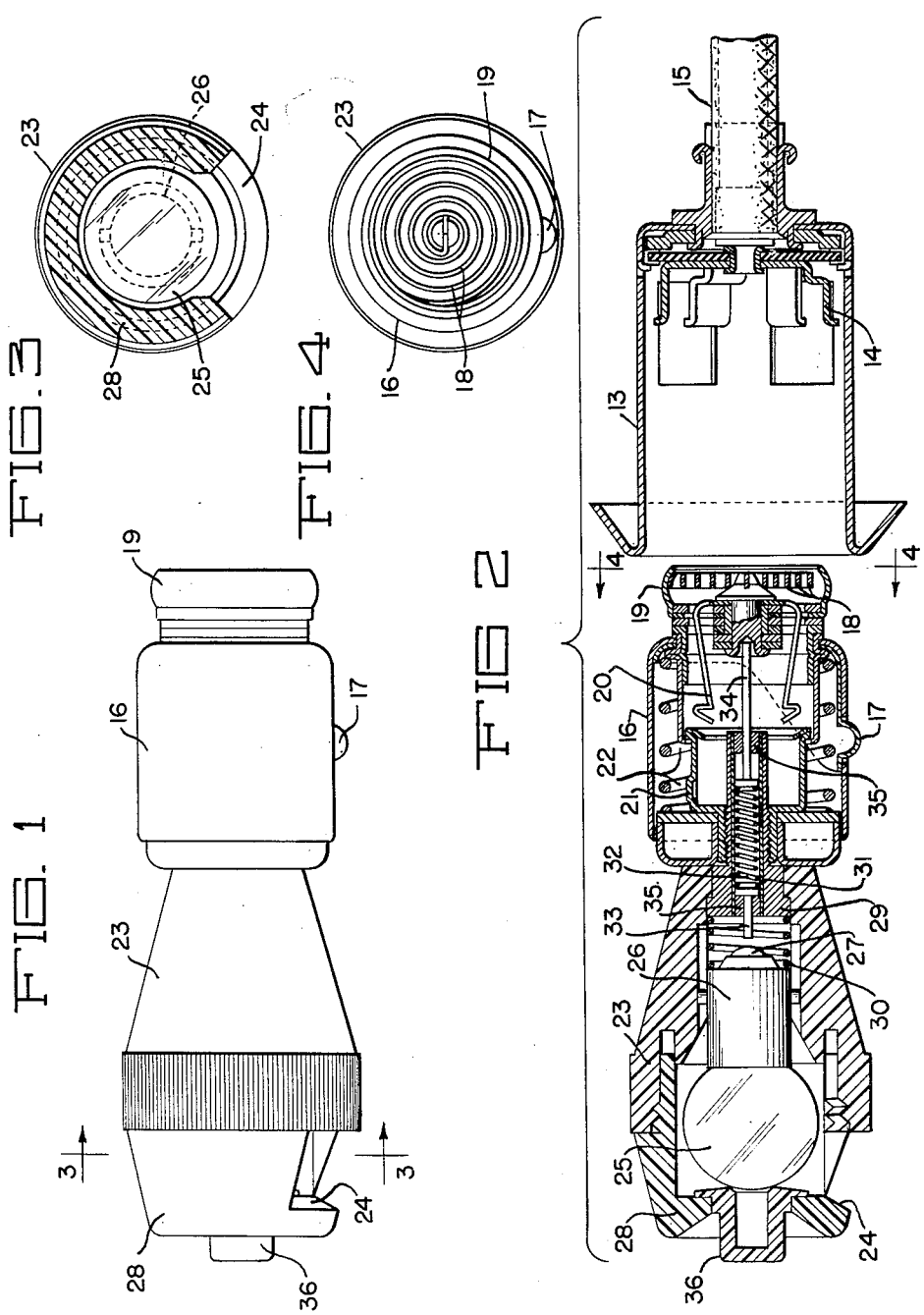
INVENTORS:
JOHN SINKO
HENRY L. MILLER
BY:
Schroeder, Merriam, Hofgren & Brady.
ATTORNEYS:

March 3, 1953
J. SINKO ET AL
2,630,539
CIGAR LIGHTER KNOB LIGHT
Filed July 26, 1951
2 SHEETS—SHEET 2
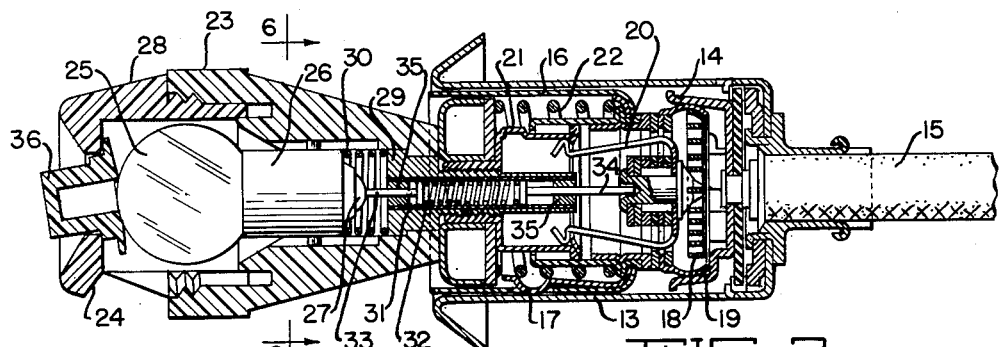
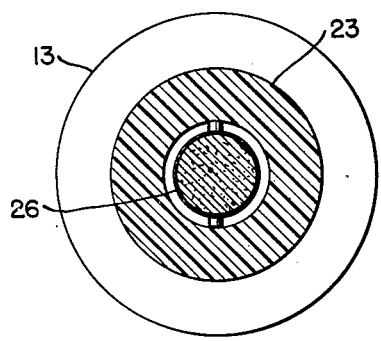
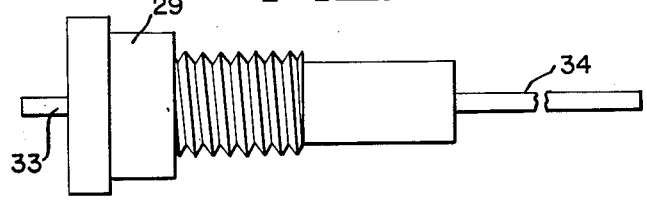
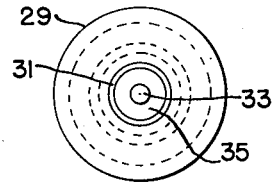
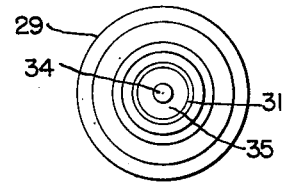
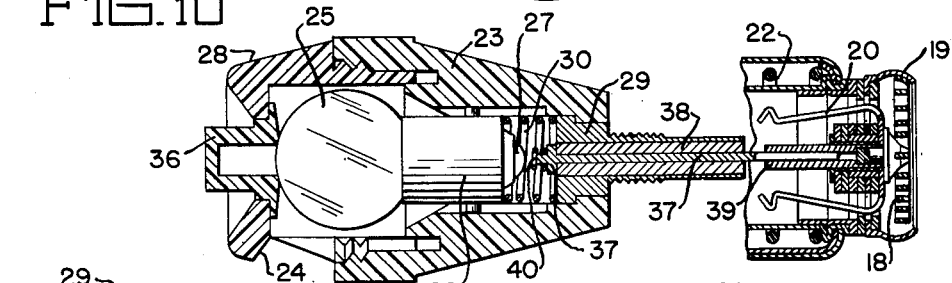
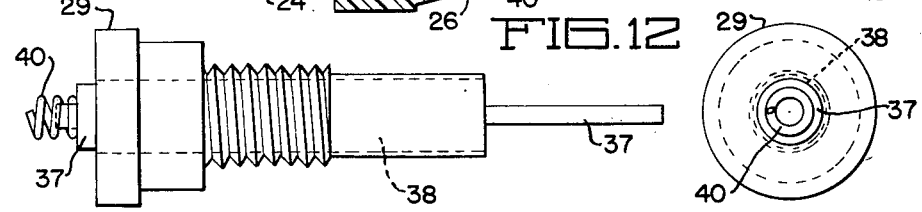
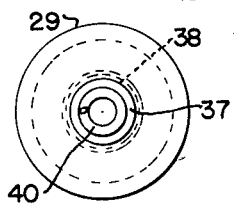
INVENTORS:
JOHN SINKO
HENRY L. MILLER
BY:
Schroeder, Merriam, Hofgren + Brady
ATTORNEYS.

Patented Mar. 3, 1953

2,630,539

UNITED STATES PATENT OFFICE 2,630,539

CIGAR LIGHTER KNOB LIGHT

John Sinko and Henry L. Miller, Chicago, Ill., assignors to Sinko Mfg. & Tool Co., a corporation of Illinois Application July 26, 1951, Serial No. 238,684

5 Claims. (Cl. 307—157)

1

This invention relates to cordless cigar lighters, and more particularly to an electric light in the knob of a cigar lighter plug having an internal telescoping switch of the type shown in Sinko Patent No. 2,498,116, issued February 21, 1950.

The primary object of the invention is to provide an instrument board light for an automobile cigar lighter which is convenient for reading a map, or the like.

A further object of the invention is to provide an electric light in the handle of a cigar lighter which may be turned on when desired but will be shorted out when the switch to the cigar lighter heating element is closed. By this arrangement, if the light is turned on and the lighter switch is then compressed to heat up the igniting element, the light will go out until the thermostatic switch opens, at which time the light will again go on and indicate the lighter is ready for use.

A further object of the invention is to provide special contacts in the cigar lighter knob, so that the electrical connection will cross the telescoping switch without interfering with the normal operation of the switch.

The invention is illustrated in a preferred embodiment in the accompanying drawings, in which:

Figure 1 is a side elevational view of a cigar lighter equipped with the knob; Fig. 2, an exploded sectional view of the cigar lighter and its socket member; Fig. 3, a sectional view, taken as indicated at line 3—3 of Fig. 1; Fig. 4, an end view, taken as indicated at line 4—4 of Fig. 2; Fig. 5, a sectional view, showing the telescoping switch of the cigar lighter closed and shorting out the light bulb circuit; Fig. 6, a sectional view, taken as indicated at line 6—6 of Fig. 5; Fig. 7, a fragmentary enlarged elevational view of the body contact of the knob; Fig. 8, a front elevational view of the same; Fig. 9, a rear elevational view; Fig. 10, a fragmentary sectional view, showing a modified form of contact; Fig. 11, an elevational view of the modified contacts illustrated in Fig. 10; and Fig. 12, an end elevational view of the same.

In the embodiment illustrated, the socket member has a tubular metal body 13 which affords a ground terminal for the plug member attached to the instrument board of an automobile. The socket member contains a plurality of spring fingers 14 which are insulated from the body 13 and connected to a current supply wire 15.

The cigar lighter plug has a metal body 16 which normally contacts the socket shell 13 by means of a spring button 17. A heating element 18 is mounted on the front of the body 16 and is insulated from the same, but its outer cup 19 normally is in engagement with the fingers 14 on the socket member. A pair of rearwardly extending fingers 20 of bi-metal are adapted to be engaged by a telescoping sleeve 21 which is urged outwardly by a spring 22. This switch controls a circuit through the heating element 18.

The present invention is concerned with the detachable cigar lighter knob 23 which preferably is made of translucent plastic material and has a portion cut away, as indicated at 24, to provide a direct light opening for a light bulb 25, having an outer terminal 26 and a central terminal 27. The plug has a threaded cap 28 to permit replacement of the light bulb.

As best shown in Figs. 5 and 7, the knob is detachably secured to the telescoping sleeve 21 of the plug by threaded engagement with a hollow contactor 29 which is maintained in electrical contact with the light bulb terminal 26 by means of a light compression spring 30. The contactor has a yielding central contact within an insulating sleeve 31. A light compression spring 32 urges one end 33 of the contact towards the light bulb and the other end 34 into contact with the center of the heating element. The contact is held assembled by sleeves 35 which make pressed fits with the insulating sleeve 31.

From the above, it will be seen that the contactor 29 has its electrical contacts in constant engagement with the spaced contacts of the thermostatic telescoping switch, but in order to close the circuit through the light bulb it is necessary to move the bulb bodily towards the contact 34. This is accomplished by means of a hollow button 36 which extends through a front opening in the cap 28. As shown in Fig. 5, the button has a shoulder which may be tilted into engagement with the inner face of the knob body, and in that position will hold the bulb terminals in closed circuit position. This will cause the light bulb to be energized by a series connection with the heating element 18. However, if the thermostatic switch is closed, as indicated in Fig. 5, the light will be short circuited out.

In the modification shown in Figs. 10 to 12, a different arrangement is shown in the central contact member. The outer metal contactor 29 is the same, but the central contact 37 is fixed in an insulating sleeve 38. The thermostatic switch is provided with a hollow sleeve 39 which makes a sliding telescoping fit with the contact 37 to permit operation of the main switch. The other end of the contact 37 is provided with a small compression spring 40, to make contact with the bulb terminal 37 only when the button 36 is pressed inwardly. The operation of the modified device is the same as described above.

The foregoing detailed description is given for clearness of understanding only, and no unnecessary limitations should be understood therefrom, for some modifications will be obvious to those skilled in the art.

We claim:

1. A knob for a cigar lighter having an internal telescoping switch for its heating element, comprising: a hollow body having a pair of electrical contacts to engage spaced contacts of the telescoping switch in the lighter; a light bulb in said body having a pair of terminals; a spring engaging one of said terminals and one of said body contacts and urging the other terminal out of contact with the other body contact; and a button for moving the light bulb terminals into closed circuit with the body contacts.

2. A device as specified in claim 1, in which one of the body contacts is centrally disposed and has a compression spring to maintain one of its ends in connection with one of the contacts on the telescoping switch.

3. A device as specified in claim 1, in which one of the body contacts is centrally disposed and has a compression spring to maintain one of its ends in connection with one of the contacts on the telescoping switch and affords a yielding end to be engaged by one of the light bulb terminals.

4. A device as specified in claim 1, in which one of the body contacts is centrally disposed and makes a telescoping sliding connection with one of the contacts on the telescoping switch.

5. A device as specified in claim 1, in which the button extends through an opening in the outer end of the knob body, said button having a shoulder which may be tilted into engagement with the inner face of said knob body to hold the bulb terminals in closed circuit position.

JOHN SINKO.
HENRY L. MILLER.

REFERENCES CITED

The following references are of record in the file of this patent:

UNITED STATES PATENTS

| Number | Name | Date |
|---|---|---|
| 2,260,588 | Smith | Oct. 28, 1941 |
| 2,473,890 | Kroll et al. | June 21, 1949 |
| 2,514,171 | Waltner | July 4, 1950 |